United States Patent
Shintani et al.

(10) Patent No.: US 11,487,815 B2
(45) Date of Patent: Nov. 1, 2022

(54) AUDIO TRACK DETERMINATION BASED ON IDENTIFICATION OF PERFORMER-OF-INTEREST AT LIVE EVENT

(71) Applicant: SONY CORPORATION, Tokyo (JP)

(72) Inventors: Peter Shintani, San Diego, CA (US); Mahyar Nejat, San Diego, CA (US); Brant Candelore, San Diego, CA (US); Robert Blanchard, San Diego, CA (US)

(73) Assignee: SONY CORPORATION, Tokyo (JP)

(*) Notice: Subject to any disclaimer, the term of this patent is extended or adjusted under 35 U.S.C. 154(b) by 475 days.

(21) Appl. No.: 16/434,116

(22) Filed: Jun. 6, 2019

(65) Prior Publication Data

US 2020/0387538 A1  Dec. 10, 2020

(51) Int. Cl.
*G06F 16/00*  (2019.01)
*G06F 16/68*  (2019.01)
*G06F 16/683*  (2019.01)
*G06F 16/687*  (2019.01)

(52) U.S. Cl.
CPC .......... *G06F 16/686* (2019.01); *G06F 16/685* (2019.01); *G06F 16/687* (2019.01)

(58) Field of Classification Search
CPC ..... G06F 16/686; G06F 16/687; G06F 16/685
USPC ........................................................ 707/772
See application file for complete search history.

(56) References Cited

U.S. PATENT DOCUMENTS

| 6,718,308 B1* | 4/2004 | Nolting .................. G10L 15/26 715/728 |
| RE43,601 E | 8/2012 | Arseneau et al. |
| 8,370,747 B2* | 2/2013 | Foxenland ............. G10H 1/368 715/728 |
| 8,635,645 B2 | 1/2014 | Krishnamoorthi et al. |
| 9,037,513 B2 | 5/2015 | Rosenblatt et al. |
| 9,507,860 B1* | 11/2016 | Oztaskent ............. G06F 16/635 |
| 9,576,050 B1* | 2/2017 | Walters ................. G06F 16/639 |
| 10,296,959 B1* | 5/2019 | Chernikhova .......... G10L 25/48 |

(Continued)

OTHER PUBLICATIONS

Vombatkere, et al. "Automatic Lyrics Display System for Live Music Performances", IEEE SigPort, IEEE Signal Processing Society, Jul. 31, 2016, pp. 1-4.

*Primary Examiner* — Ashish Thomas
*Assistant Examiner* — Rezwanul Mahmood
(74) *Attorney, Agent, or Firm* — Chip Law Group

(57) ABSTRACT

An electronic device includes circuitry, firmware, and software that determines identification information associated with a first performer-of-interest at a live event and retrieves a first set of audio tracks from a plurality of audio tracks based on the determined identification information. The circuitry receives a first audio segment associated with the first performer-of-interest from an audio capturing device. The circuitry compares a first audio characteristic of the first audio segment with a second audio characteristic of a first audio portion of each of the first set of audio tracks. The circuitry determines a first audio track based on the comparison between the first audio characteristic and the second audio characteristic. The circuitry identifies a start position of the first audio track based on the first audio segment associated with the first audio track. The circuitry controls a display of the first lyrics information of the first audio track.

19 Claims, 7 Drawing Sheets

(56) References Cited

U.S. PATENT DOCUMENTS

| | | | |
|---|---|---|---|
| 10,417,279 B1* | 9/2019 | Beech | G06F 16/639 |
| 11,245,950 B1* | 2/2022 | Mahar | G10L 15/26 |
| 2002/0072982 A1* | 6/2002 | Barton | G06Q 30/0625 |
| | | | 705/14.1 |
| 2006/0156909 A1* | 7/2006 | Kobayashi | G10H 7/002 |
| | | | 84/645 |
| 2007/0282844 A1* | 12/2007 | Kim | G06F 16/68 |
| 2007/0291958 A1* | 12/2007 | Jehan | G10H 1/0025 |
| | | | 381/103 |
| 2011/0276157 A1* | 11/2011 | Wang | G06F 16/95 |
| | | | 700/94 |
| 2011/0276333 A1* | 11/2011 | Wang | G10L 25/48 |
| | | | 704/E21.001 |
| 2012/0046949 A1* | 2/2012 | Leddy | G10L 13/033 |
| | | | 704/260 |
| 2012/0072418 A1* | 3/2012 | Svendsen | G06F 16/637 |
| | | | 707/724 |
| 2012/0096018 A1* | 4/2012 | Metcalf | G11B 27/105 |
| | | | 707/E17.014 |
| 2012/0239526 A1 | 9/2012 | Revare | |
| 2013/0070093 A1* | 3/2013 | Rivera | G06Q 20/123 |
| | | | 348/143 |
| 2013/0185069 A1* | 7/2013 | Tanaka | G10L 15/26 |
| | | | 704/235 |
| 2014/0000441 A1* | 1/2014 | Miyajima | G10H 1/0008 |
| | | | 84/609 |
| 2014/0095333 A1* | 4/2014 | Zises | G06Q 30/06 |
| | | | 705/26.1 |
| 2014/0161263 A1* | 6/2014 | Koishida | G10L 19/018 |
| | | | 381/56 |
| 2014/0172429 A1* | 6/2014 | Butcher | G10L 19/018 |
| | | | 704/270 |
| 2014/0337374 A1* | 11/2014 | Glass | G06F 16/435 |
| | | | 707/769 |
| 2015/0050998 A1* | 2/2015 | Stelovsky | A63F 13/71 |
| | | | 463/31 |
| 2015/0082330 A1* | 3/2015 | Yun | H04N 21/25891 |
| | | | 725/18 |
| 2015/0302086 A1* | 10/2015 | Roberts | G06F 16/683 |
| | | | 707/771 |
| 2015/0373428 A1* | 12/2015 | Trollope | H04N 21/233 |
| | | | 704/235 |
| 2017/0093943 A1* | 3/2017 | Alsina | H04L 65/1083 |
| 2017/0097992 A1* | 4/2017 | Vouin | G06F 16/686 |
| 2017/0150225 A1* | 5/2017 | Trollope | H04N 21/47214 |
| 2017/0263029 A1* | 9/2017 | Yan | G06F 3/04845 |
| 2018/0144746 A1* | 5/2018 | Mishra | G10L 15/25 |
| 2018/0197532 A1* | 7/2018 | Rajendran | G06F 40/279 |
| 2018/0239819 A1* | 8/2018 | Yangsong | G06F 16/632 |
| 2018/0349493 A1* | 12/2018 | Zhao | G10H 1/366 |
| 2018/0349495 A1* | 12/2018 | Zhao | G10L 15/26 |
| 2018/0366097 A1* | 12/2018 | Sharp | G10L 15/22 |
| 2019/0096407 A1* | 3/2019 | Lambourne | G11B 27/10 |
| 2019/0108188 A1* | 4/2019 | Fu | G06Q 50/01 |
| 2019/0335229 A1* | 10/2019 | Wang | H04N 21/8113 |
| 2020/0105286 A1* | 4/2020 | Sen | G10H 1/361 |
| 2020/0314507 A1* | 10/2020 | Yen | H04N 21/6581 |
| 2020/0329331 A1* | 10/2020 | Cappello | H04S 3/008 |
| 2020/0387538 A1* | 12/2020 | Shintani | G06F 16/687 |
| 2020/0388261 A1* | 12/2020 | Candelore | G10H 1/0083 |
| 2020/0388284 A1* | 12/2020 | Candelore | H04N 21/440236 |

* cited by examiner

AUDIO TRACK DETERMINATION BASED ON IDENTIFICATION OF PERFORMER-OF-INTEREST AT LIVE EVENT

CROSS-REFERENCE TO RELATED APPLICATIONS/INCORPORATION BY REFERENCE

None.

FIELD

Various embodiments of the disclosure relate to audio and video presentation technologies. More specifically, various embodiments of the disclosure relate to apparatus and method for audio track determination based on identification of a performer-of-interest at a live event.

BACKGROUND

Advancements in the field of audio and video presentation technologies has led to an increase in use of subtitles and closed captions in videos, movies, or television programs. The subtitles may be transcription of a spoken dialogue or the phrase in a plurality of other languages to be understandable by a plurality of users. The closed captions include subtitles for almost every sound (e.g., sound emitted by objects other than spoken dialogue of a human being and onomatopoeias). Typically, the subtitles or the closed captions are generated beforehand, and may be embedded in the video along with position markers that indicate where the subtitle or closed captions should appear and disappear in the video. However, in live scenarios, such as live concerts, it may be difficult to predict if a singer will sing a particular song in its original version maintaining original lyrics, speed of vocal deliverance, or use new words to address the audience in between the song. Further, in such scenarios, a user, for example, a person in the audience of the live concert may not be able to view the lyrics (or correct version of lyrics) at the time when a singer sings a song on the stage. In certain scenarios, the user may be unable to even identify the song that the singer is singing, as the singer may be singing a different version of the song, such as a remix version. Further difference in phonetics and pronunciation of the song by the singer in different regions of the world also makes it difficult to identify the song resulting in reduced user experience, which may be undesirable.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An apparatus and method for audio track determination based on identification of a performer-of-interest at a live event is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed apparatus and method for audio track determination based on identification of a performer-of-interest at a live event. Exemplary aspects of the disclosure provide an electronic device that may include circuitry, firmware, and software. The firmware and software may be used to provide an interface for a user to control the circuitry. The electronic device may identify the audio track (such as the song) based on identification information of the performer-of-interest (such as the singer of the live concert). The identification information may be a name or any identity of the performer-of-interest of the live event. The electronic device may be further configured to identify a start position of the audio track (e.g. the song) that the singer may be singing in the live concert and notify the user in the audience about the start position of the audio track. In such scenarios, the user in the audience of the live event may be aware that the singer is about to start singing the song and may be able to follow along with the singer during the live concert. The electronic device may be further configured to display the lyrics of the song that the singer may be singing in the live concert in real-time or near real-time when the singer may be singing the song in the live concert.

Traditionally, it may very difficult to understand the lyrics of a song sung in live venues, such as music halls, sports arenas, and the like. Many attendees (e.g., fans of a singer) often know the lyrics of hit songs, but not the less popular songs of musical artists. One of the reasons for the difficulty in identification of the song may be difference in pronunciation and phonetics enunciated by the singers from different regions around the world. Another reason may be a different version of the original song, such as a remix version, a pop version, and the like, may be sung by the singer at the live event. Further, sound of other musical instruments (with reverberation), the acoustics of the music hall, the volume/pitch of the voices, consonants stretched to match the melody, may be some other reasons due to which the audience may be unable to identify the song and understand the correct lyrics of the song that the singer may sing at the live event. Because the audience cannot clearly understand the words of many songs, their enjoyment of the singing and overall concert is reduced. The disclosed apparatus and method for audio track determination based on identification of a performer-of-interest (for example, a singer) at a live event enables display of the correct lyrics of the song that the singer may be singing in the live concert in real-time or near real-time, thereby providing an enhanced user experience at the live event.

Figure 1:
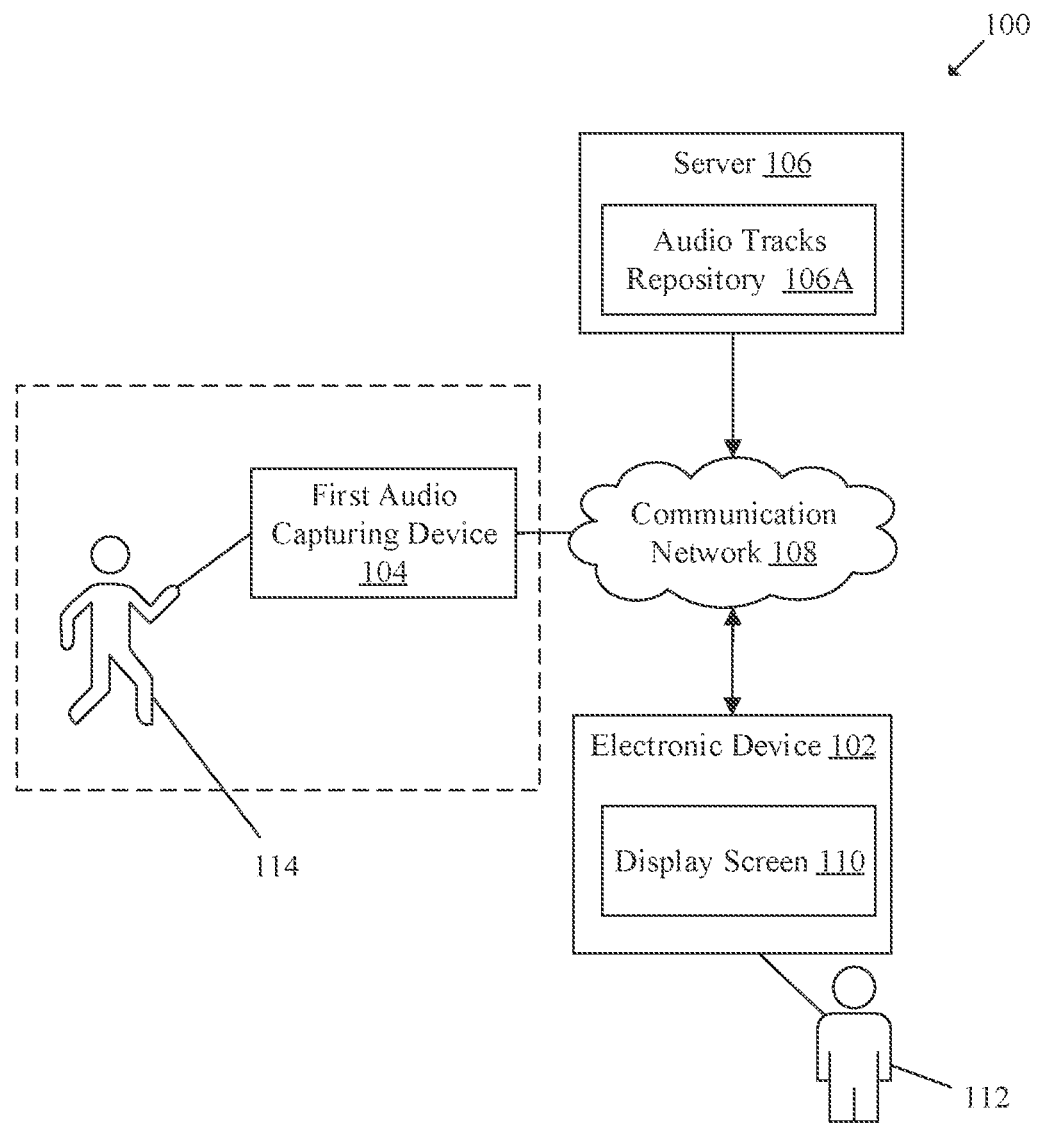
FIG. 1 is a block diagram that illustrates an exemplary network environment for audio track determination based on identification of a performer-of-interest at a live event, in accordance with an embodiment of the disclosure.

FIG. 1 is a block diagram that illustrates an exemplary network environment for audio track determination based on identification of a performer-of-interest at a live event, in accordance with an embodiment of the disclosure. With reference to FIG. 1, there is shown a network environment 100. The network environment 100 may include an electronic device 102, a first audio capturing device 104, a server 106, and a communication network 108. The electronic device 102 may include a display screen 110. The electronic device 102 may be communicatively coupled to the first audio capturing device 104 and the server 106, via the communication network 108. A user 112 may be associated with the electronic device 102. A first performer-of-interest 114, such as a singer or other artist, may be associated with the first audio capturing device 104.

The electronic device 102 may comprise suitable logic, circuitry, and interfaces that may be configured to determine identification information of the first performer-of-interest 114, such as a singer in a live concert. The electronic device 102 be further configured to retrieve a first set of audio tracks of the first performer-of-interest 114 (e.g. a set of songs of a specific singer) from a plurality of audio tracks (e.g. a plurality of songs of different singers) from the server 106, based on the determined identification information of the first performer-of-interest 114. Examples of the electronic device 102 may include, but are not limited to, a smart phone, a wearable smart-glass device, a head-mounted device, a computing device, a conferencing device, a mainframe machine, a server, a computer work-station, or a consumer electronic (CE) device.

The first audio capturing device 104 may comprise suitable logic, circuitry, and interfaces that may be configured to capture a plurality of first audio segments enunciated by the first performer-of-interest 114 (e.g., a singer). The captured plurality of first audio segments may be different portions of an audio track, such as a song sung by the first performer-of-interest 114 in the live event. Examples of the first audio capturing device 104 may include, but are not limited to, a microphone, a recorder, a Musical Instrument Digital Interface (MIDI) keyboard.

The server 106 may comprise suitable logic, circuitry, firmware, software, memory, and interfaces that may be configured to store the plurality of first audio segments captured by the first audio capturing device 104. The server 106 may include an audio tracks repository 106A. The audio tracks repository 106A may include the plurality of audio tracks that may be associated with a plurality of users-of-interests (e.g., different singers and artists). For example, the audio tracks repository 106A may include a plurality of songs sung by a plurality of different singers or bands. Examples of the server 106 may include, but are not limited to a database server, a file server, a web server, a cloud server, an application server, a mainframe server, or other types of server.

The communication network 108 may comprise suitable logic, circuitry, and interfaces that may include a communication medium through which the electronic device 102, the first audio capturing device 104, and the server 106, may communicate with each other. Examples of the communication network 108 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The display screen 110 may comprise suitable logic, circuitry, firmware, software, and interfaces that may be configured to display lyrics information of the determined first audio track, such as a song. In some embodiments, the display screen 110 may be a touch screen, which may enable the user 112 to provide input via the display screen 110. The touch screen may be at least one of a resistive touch screen, a capacitive touch screen, or a thermal touch screen. In some embodiments, the display screen 110 may be an external display screen that may be associated with the electronic device 102. The display screen 110 may be realized through several known technologies such as, but not limited to, at least one of a Liquid Crystal Display (LCD) display, a Light Emitting Diode (LED) display, a plasma display, or an Organic LED (OLED) display technology, or other display screens. In accordance with an embodiment, the display screen 110 may refer to a display screen of a head mounted device (HMD), a smart-glass device, a see-through display, a projection-based display, an electro-chromic display, or a transparent display.

The user 112 (for example spectator) may be a part of an audience in a live event, such as a live concert, a live conference, and the like. The user 112 may utilize an input device, such as a touch screen, a microphone, and the like, to provide an input to the electronic device 102. The first performer-of-interest 114 may be a human artist who may be associated with the first audio capturing device 104, such as a microphone. For example, the first performer-of-interest 114 may be a singer that may perform at a live concert.

In operation, the electronic device 102 may be configured to determine identification information associated with the first performer-of-interest 114 at a live event. For example, the first performer-of-interest 114 may be a singer of a live concert. The first performer-of-interest 114 may be associated with the first audio capturing device 104. The identification information associated with the first performer-of-interest 114 (for example, the singer of the live concert or a band performing at a live concert) may be an identity, such as name of the first performer-of-interest 114. The electronic device 102 may determine the identification information associated with the first performer-of-interest 114, based on a geo-location of the live event associated with the first performer-of-interest 114. The electronic device 102 may be configured to determine a geo-location of the electronic device 102 and an occurrence of the live event at the determined geo-location of the electronic device 102. For example, a live concert may be taking place at the same geo-location as of the electronic device 102, and the electronic device 102 may determine which event is scheduled at the determined geo-location to extract the identification information of the singer of the live concert.

In accordance with an embodiment, the electronic device 102 may be further configured to determine the identification information associated with the first performer-of-interest 114, based on a user input. For example, a user, such as the user 112 (i.e. spectator), who is a part of the audience of the live concert may provide an input for the identity, such as name, of the first performer-of-interest 114 (e.g., singer of the live concert) to the electronic device 102. In accordance with an embodiment, the electronic device 102 may be further configured to determine the identification information associated with the first performer-of-interest 114, based on date-time information of the live event. For example, the electronic device 102 may store a list of a plurality of events that may occur at a particular date and time, and the stored list may include an identity of a performer-of interest (such as a singer) associated with each of the plurality of events. The stored list may include the date-time information of each of the plurality of events. The electronic device 102 may be further configured to determine the identification information of the performer-of-interest 114 (e.g., singer of the live concert) based on a current date and current time. For example, the electronic device 102 may compare the current date and current time with the stored list that includes the date-time information of the live event and determine a live event that may occur at the current date and current time. Further, the electronic device 102 may determine the identification information (for example, name of a singer of a live concert) of the performer-of-interest 114, associated with the live event occurring at the current date and the current time.

The audio tracks repository 106A may include a plurality of audio tracks associated with a plurality of users-of-interests. For example, the audio tracks repository 106A may be a repository of a plurality of songs of a plurality of singers around the world. The electronic device 102 may be further configured to retrieve a first set of audio tracks associated with the first-user-interest from the audio tracks repository 106A, based on the determined identification information associated with the first performer-of-interest 114. For example, the electronic device 102 may be configured to retrieve a first set of songs of the first performer-of-interest 114 (e.g., a first singer) from the audio tracks repository 106A, based on a name of the first performer-of-interest 114. The electronic device 102 may retrieve all the songs that may be sung by the first performer-of-interest 114 (e.g., the first singer of the live concert). For example, the retrieved first set of audio tracks may be the songs sung by the first performer-of-interest 114 in previous live concerts and may not be the songs that are recorded in a studio. In accordance with an embodiment, the server 106 may further store lyrics information associated with each audio track of the plurality of audio tracks stored in the audio tracks repository 106A. The electronic device 102 may be further configured to extract the lyrics information associated with the retrieved first set of audio tracks of the first performer-of-interest 114.

Thus, the use of the determined identification information associated with the first performer-of-interest 114 enables electronic device 102 to significantly narrow down a search to only the audio tracks that may be sung by the first performer-of-interest 114, which makes the determination of the audio track enunciated by the first performer-of-interest 114 at the live event faster as compared to conventional techniques for determination of the audio track.

In accordance with an embodiment, the electronic device 102 may be further configured to receive a first audio segment of a vocal deliverance of the first performer-of-interest 114 from the first audio capturing device 104. For example, the received first audio segment of the vocal deliverance of the first performer-of-interest 114 may be a segment of a song sung by the first performer-of-interest 114 (such as the first singer) in a live concert. The received first audio segment may have a first audio characteristic of a plurality of audio characteristics. Each audio characteristic of the plurality of audio characteristics, such as the first audio characteristic, may be a combination of a plurality of audio parameters. The plurality of audio parameters may include, but are not limited to, a loudness parameter, a pitch parameter, a tone parameter, a rate-of-speech parameter, a voice quality parameter, a phonetic parameter, an intonation parameter, an intensity of overtones, a voice modulation parameter, a pronunciation parameter, a prosody parameter, a timbre parameter, and one or more psychoacoustic parameters. For example, the first audio characteristic of the first audio segment may be a combination of different levels of the plurality of audio parameters.

The electronic device 102 may be further configured to compare the first audio characteristic of the received first audio segment with a second audio characteristic of a first audio portion of each of the retrieved first set of audio tracks associated with the first performer-of-interest 114. Alternatively stated, the first audio characteristic may be compared the second audio characteristic of the first audio portion of each audio track of the first set of audio tracks. For example, the first audio characteristic of the first audio segment (such as a segment of a song sung by the first performer-of-interest 114) may be compared with a first audio portion (such as a portion of a song) of each of the first set of audio tracks (such as a set of songs sung by the first performer-of-interest 114). In another example, the first audio portion may be a starting portion of each audio track of the first set of audio tracks.

The electronic device 102 may be further configured to determine a first audio track from the retrieved first set of audio tracks based on the comparison between the first audio characteristic of the first audio segment and the second audio characteristic of an audio portion of each of the first set of audio tracks. For example, the determined first audio track may be a song that the first performer-of-interest 114 may be currently singing in a live concert. The electronic device 102 may determine the first audio track, such that the received audio segment may correspond to a portion of the first audio track. For example, the electronic device 102 may determine a song that the performer-of-interest 114 (such as the first singer) may be currently singing in the live event, from the received audio segment. The first audio characteristic of the first audio segment may be nearly same as the second audio characteristic of the first audio track. The electronic device 102 may determine the first audio track, if the first audio characteristic of the first audio segment is same or nearly same as the second audio characteristic of the first audio track.

In accordance with an embodiment, the electronic device 102 may be further configured to convert the received first audio segment to text to generate first text information for the received first audio segment. The electronic device 102 may be further configured to compare the converted first text information of the first audio segment with second text information associated with the first audio portion of each audio track of the retrieved first set of audio tracks. The second text information associated with the first audio portion of each audio track of the retrieved first set of audio tracks may be a portion of the lyrics information associated with the first audio portion (for example, a beginning portion of a song) of each audio track (for example, a song) of the retrieved first set of audio tracks. The electronic device 102 may be further configured to determine the first audio track (for example, the song that the first performer-of-interest 114 may be currently singing in the live concert), based on the comparison of the first text information with the second text information. The received audio segment may correspond to a portion of the determined audio track if the first text information matches with the second text information. For example, the electronic device 102 may determine a song that the performer-of-interest 114 may be currently singing in the live concert if the first text information of the audio segment matches with the second text information of a corresponding portion of the song.

The electronic device 102 may be further configured to identify a start position of the determined first audio track. The start position of the determined first audio track may be a position in the first audio track where the lyrics of the song actually begin. The electronic device 102 may be configured to identify the start position of the first audio track based on the received first audio segment. For example, the received first audio segment may be an introductory portion of an audio track (such as the first audio track) and the electronic device 102 may be configured to identify the start position of the song. The start position of the song may be the position of the song when the first performer-of-interest 114 (such as the first singer) may start to sing the lyrics of the song. The electronic device 102 may be further configured to generate notification information associated with the identified start position of the first audio track. The electronic device 102 may be further configured to control the display screen 110 to display the generated notification information. The displayed notification information on the display screen 110 may be utilized to notify a user, such as the user 112, of the electronic device 102 that the first performer-of-interest 114 (such as the first singer) is about to start the lyrics portion of the determined first audio track (such as a first song of the first singer). Thus, the user 112 may become aware when the first performer-of-interest 114 will start to sing the lyrics of the determined first audio track. The electronic device 102 may be further configured to control the display screen 110 to display the first lyrics information of the determined first audio track based on the identified start position. For example, the electronic device 102 may be configured to display the lyrics of the song that the first performer-of-interest 114 (such as the first singer) on the display screen 110, based on the identified start position of the song. As a result of the display the lyrics of the song as the song is sung in real time or near real time, the user 112 may be able to follow the song along with the first performer-of-interest 114 during the singing of the determined first audio track at the live event.

In accordance with an embodiment, the electronic device 102 may be further configured to receive a plurality of first audio segments associated with the determined first audio track from the first audio capturing device 104 at the live event. The plurality of first audio segments may be other audio portions of the first audio track, where the other audio portions may lie subsequent to the first audio portion of the first audio track. For example, the electronic device 102 may receive the plurality of first audio segments that may be the subsequent portions of the song that the first performer-of-interest 114 (such as the first singer) may be singing at the live concert, such as, a second audio portion may be subsequent to the first audio portion of the first audio track. The electronic device 102 may be further configured to extract first text information from the first lyrics information for each of the plurality first audio segments. Alternatively stated, the extracted first text information may be a portion of the lyrics information associated with each audio segment of the plurality of first audio segments (for example, the plurality of other portions of the song that the first singer may be singing in the live concert). The electronic device 102 may be further configured to control the display screen 110 to display the extracted first text information when the first performer-of-interest 114 (such as the first singer) may sing each of the plurality of first audio segments during the live concert. The electronic device 102 may be configured to control the display of the extracted first text information associated with each of the plurality of first audio segments in synchronization with the first performer-of-interest 114 (such as the first singer) that may be singing each of the plurality of first audio segments in the live concert. For example, when the first performer-of-interest 114 may sing a plurality of portions of the first audio track, the electronic device 102 may be configured to display the first text information associated with each portion of the first audio track in real-time or near real-time.

In accordance with another embodiment, the electronic device 102 may be further configured to receive a second audio segment of a vocal deliverance of a second performer-of-interest (for example, a second singer) from the first audio capturing device 104 or another audio capturing device (not shown) at the live event. For example, the second audio segment may be a portion of a second song that a second singer may be singing during the live concert. The second audio segment may be associated with a third audio characteristic of the plurality of audio characteristics. The electronic device 102 may be further configured to determine a second audio track from the retrieved first set of audio tracks based on a comparison between the third audio characteristic of the second audio segment and a fourth audio characteristic of a second audio portion of each audio track of the retrieved first set of audio tracks. For example, the third audio characteristic of the second audio segment (such as a segment of a song sung by the second performer-of-interest) may be compared with a second audio portion (such as a portion of a song) of each of the first set of audio tracks (such as a set of songs sung by the first performer-of-interest 114). In another example, the second audio portion may be a portion of the audio track of each audio track of the retrieved first set of audio tracks. The second audio track may be different from the first audio track. The electronic device 102 may be further configured to extract second lyrics information of the determined second audio track from the lyrics information of each audio track of the plurality of audio tracks stored in the server 106. For example, the second lyrics information of the second audio track may be the lyrics of the second audio track (such as the second song sung by the second performer-of-interest). The electronic device 102 may be further configured to control display screen 110 of the second lyrics information of the determined second audio track. The second lyrics information may be displayed in synchronization with the playback of the second audio track by the second performer-of-interest (such as the second singer). For example, the user 112 may be able identify the second audio track that the second performer-of-interest may be singing in the live concert and may further be able to view the second lyrics information associated with the second audio track on the display screen 110 when the second performer-of-interest sings the second audio track in the live concert.

Figure 2:
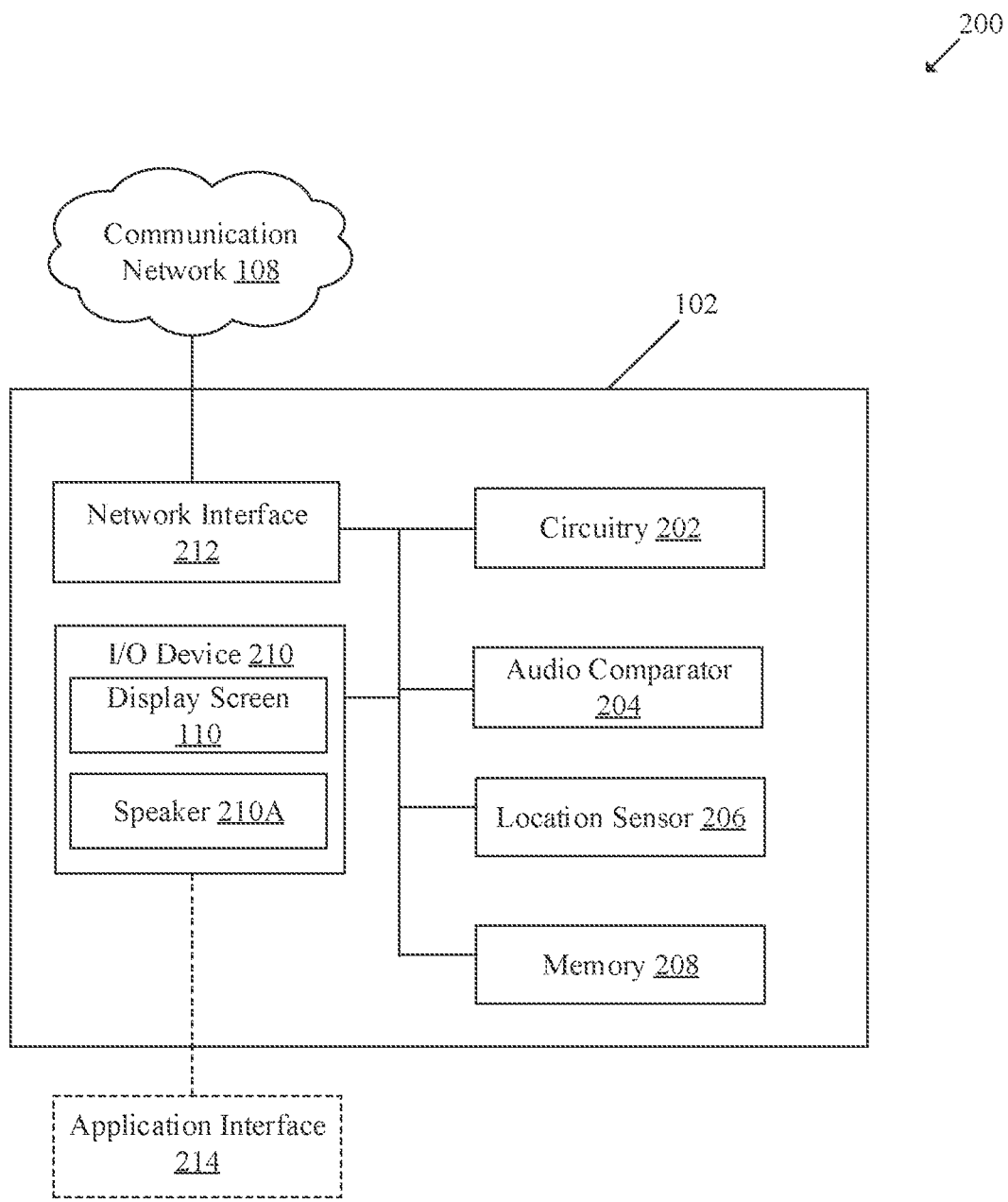
FIG. 2 is a block diagram that illustrates an exemplary electronic device for audio track determination based on identification of a performer-of-interest at a live event, in accordance with an embodiment of the disclosure.

FIG. 2 is a block diagram that illustrates an exemplary electronic device for audio track determination based on identification of a performer-of-interest at a live event, in accordance with an embodiment of the disclosure. FIG. 2 is explained in conjunction with elements from FIG. 1. With reference to FIG. 2, there is shown the electronic device 102. The electronic device 102 may include circuitry 202, an audio comparator 204, a location sensor 206, a memory 208, an input/output (I/O) device 210, and a network interface 212. The I/O device 210 may include the display screen 110 and a speaker 210A. The display screen 110 may be utilized render an application interface 214. The circuitry 202 may be communicatively coupled to the audio comparator 204, the location sensor 206, the memory 208, and the I/O device 210. The circuitry 202 may be configured to communicate with the server 106, by use of the network interface 212.

The circuitry 202 may comprise suitable logic, circuitry, and interfaces that may be configured to determine the identification information (e.g. the name) associated with the first performer-of-interest 114 (e.g. the first singer). The circuitry 202 may be further configured to receive an audio segment, such as the first audio segment, associated with a vocal deliverance of the first performer-of-interest 114 from the first audio capturing device 104, at the live event. The circuitry 202 may be further configured to determine an audio track, such as the first audio track (e.g. a song that a singer may be singing in the live concert), enunciated by the first performer-of-interest 114, from the first set of audio tracks of the first performer-of-interest 114, based on the received first audio segment. The circuitry 202 may be implemented based on a number of processor technologies known in the art. Examples of the processor technologies may be a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), other processors, and the like.

The audio comparator 204 may comprise suitable logic, circuitry, and interfaces that may be configured to compare the first audio characteristic of the first audio segment with the second audio characteristic of an audio portion, such as the first audio portion, of each audio track of the first set of audio tracks. The audio comparator 204 may compare the first audio characteristic and the second audio characteristic based on a comparison of the level of the plurality of audio parameters of the first audio characteristic and the second audio characteristic. The audio comparator 204 may be implemented based on a number of processor technologies known in the art.

The location sensor 206 may comprise suitable logic, circuitry, and interfaces that may be configured to detect a geo-location of the electronic device 102. The location sensor 206 may be a Global Navigation Satellite System (GNSS) sensor that relies on tracking data from a constellation of satellites to estimate the geo-location (such as latitude and longitude values). Examples of the constellation of the GNSS sensor may include, but are not limited to, a Global Positioning System (GPS), a Global Navigation Satellite System (GLONASS), an Indian Regional Navigation Satellite System (IRNSS), a Beidou System, a Galileo System, or other global or regional navigation satellite systems. Alternatively, the location sensor 206 may include an accelerometer or a velocity sensor along with a gyroscopic sensor to estimate a location by updating a reference location of the electronic device 102.

The memory 208 may comprise suitable logic, circuitry, and interfaces that may be configured to store the received plurality of first audio segments from the first audio capturing device 104. Examples of implementation of the memory 208 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 210 may comprise suitable logic, circuitry, and interfaces that may be configured to receive an input from a user, such as the user 112, and provide an output to the user 112, based on the received input from the user 112. The I/O device 210 may include various input and output devices, which may be configured to communicate with the circuitry 202. Examples of the I/O device 210 may include, but are not limited to, a touch screen, a keyboard, a mouse, a joystick, a microphone, a display screen (for example, the display screen 110), and a speaker (for example, the speaker 210A).

The network interface 212 may comprise suitable logic, circuitry, and interfaces that may be configured to facilitate communication between the electronic device 102, the first audio capturing device 104, and the server 106, via the communication network 108. The network interface 212 may be implemented by use of various known technologies to support wired or wireless communication of the electronic device 102 with the communication network 108. The network interface 212 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 212 may communicate via wireless communication with networks, such as the Internet, an Intranet or a wireless network, such as a cellular telephone network, a wireless local area network (LAN), and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11a, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The application interface 214 may correspond to a user interface (UI) rendered on a display screen, such as the display screen 110. The application interface 214 may display the first lyrics information of the determined first audio track. An example of the application interface 214 may include, but is not limited to, a graphical user interface (GUI).

Figure 3:
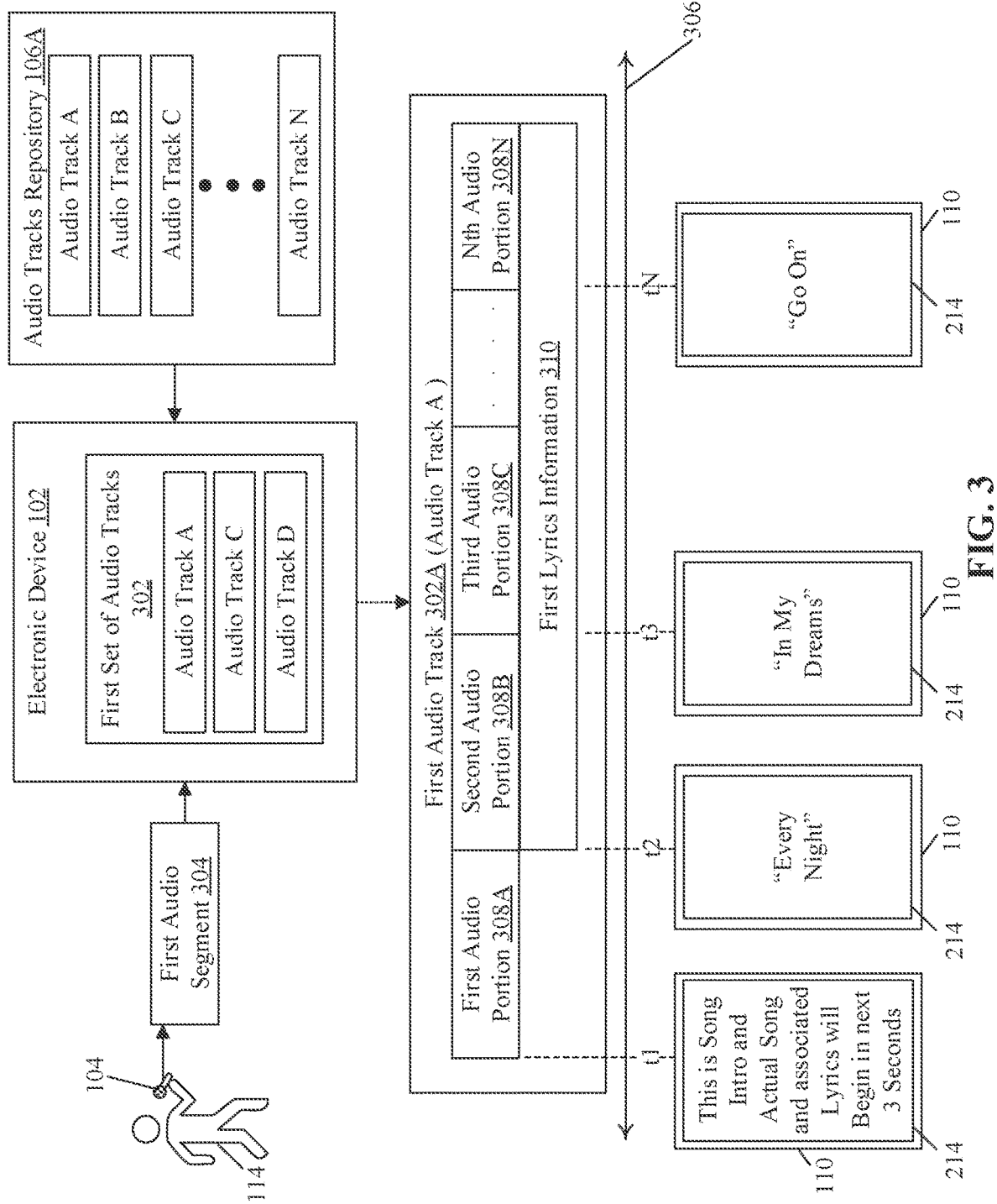
FIG. 3 illustrates a scenario for determination of an audio track enunciated by a performer-of-interest at a live event based on identification of the performer-of-interest, in accordance with an embodiment of the disclosure.

FIG. 3 illustrates a scenario for determination of an audio track enunciated by a performer-of-interest at a live event based on identification of the performer-of-interest at a live event, in accordance with an embodiment of the disclosure. FIG. 3 is explained in conjunction with elements from FIG. 1 and FIG. 2. With reference to FIG. 3, there is shown the electronic device 102, the first audio capturing device 104, the audio tracks repository 106A, the display screen 110, the first performer-of-interest 114, the application interface 214, and a first set of audio tracks 302. There is further shown, a first audio segment 304, a first audio track 302A, a timeline 306, a plurality of audio portions 308A to 308N of the first audio track 302A, and first lyrics information 310, with reference to FIG. 3. In accordance with an embodiment, the first performer-of-interest 114 (for example, a first singer) may be associated with the first audio capturing device 104 during a live event, such as a live concert. The electronic device 102 may be utilized by a user, such as the user 112 during the live event.

The circuitry 202 may be further configured to determine the identification information of the first performer-of-interest 114 (e.g., the first singer), based on a geo-location of the electronic device 102. The location sensor 206 may be configured to determine the geo-location of the electronic device 102. The geo-location of the electronic device 102 may be same as the geo-location of the live event, where the first performer-of-interest 114 (e.g., the first singer) associated with the first audio capturing device 104 may also be present. The circuitry 202 may be further configured to determine the identification information, such as, the name of the first performer-of-interest 114, based on the geo-location of the electronic device 102. In some embodiments, the circuitry 202 may be configured to determine the identification information of the first performer-of-interest 114, based on a user-input. In such cases, the circuitry may receive the identification information (such as the name) of the first performer-of-interest 114, from a user, such as the user 112.

The circuitry 202 may be further configured to retrieve the first set of audio tracks 302 from the audio tracks repository 106A, based on the identification information of the first performer-of-interest 114. The first set of audio tracks 302 may be significantly lesser in number than the number of audio tracks in the audio tracks repository 106A. The audio tracks repository 106A may include the plurality of audio tracks (for example, a plurality of songs sung by a plurality of singers). For example, as shown in FIG. 3, the audio tracks repository 106A may include the plurality of audio tracks, such as Audio Track A, Audio Track B, Audio Track C, . . . , Audio Track N. The circuitry 202 may retrieve the first set of audio tracks 302 from the audio tracks repository 106A, where the first set of audio tracks 302 may be a set of audio tracks associated with only the first performer-of-interest 114. For example, the first set of audio tracks 302 may be a plurality of songs that may be sung by the first performer-of-interest 114 in previous live concerts. As shown in FIG. 3, the first set of audio tracks 302 may include the Audio Track A, the Audio Track C and the Audio track D of the audio tracks repository 106A. Each audio track of the first set of audio tracks 302 may include a plurality of audio portions. For example, the first audio track 302A (also represented as Audio Track A) may include the plurality of audio portions 308A to 308N, which may include a first audio portion 308A, a second audio portion 308B, a third audio portion 308C, . . . , N$^{th}$ audio portion 308N.

The circuitry 202 may be further configured to receive the first audio segment 304 of a vocal deliverance of the first performer-of-interest 114 from the first audio capturing device 104 (or other relaying device) at the live event. For example, the received first audio segment 304 may be a portion of a song sung by the first performer-of-interest 114 during the live concert. The audio comparator 204 may be configured to compare a first audio characteristic of the received first audio segment 304 with a second audio characteristic of an audio portion (such as an initial audio portion) of each audio track of the first set of audio tracks 302. The first audio track may be a first combination of each of the plurality of audio parameters and the second audio characteristic may be a second combination of each of the plurality of audio parameters. For example, the first audio characteristic of the first audio segment may be compared with the second audio characteristic of the first audio portion 308A (such as a portion of a song) of the first audio tracks 302A (also represented as the Audio Track A). The audio comparator 204 may be further configured to determine the first audio track 302A (also represented as Audio Track A) from the first set of audio tracks 302 if the first audio characteristic of the received first audio segment 304 is same or nearly same (i.e., a similarity score greater than a specified threshold) as the second audio characteristic of the first audio portion 308A of the first audio track 302A (also represented as Audio Track A). For example, the audio comparator 204 may determine the song that the first performer-of-interest 114 may sing in the live concert based on the comparison of the first audio characteristic of the received first audio segment 304 (such as a part of the song) with the second audio characteristic of an initial audio portion of each song of the first set of songs of the first performer-of-interest 114 (such as the first singer). Thus, the user 112 may be aware of the song that the first performer-of-interest 114 may sing in the live concert.

The circuitry 202 may be further configured to identify the start position of the determined first audio track 302A (also represented as the Audio Track A). The start position of the first audio track 302A may be a position in the first audio track 302A where the first performer-of-interest 114 may actually start singing the lyrics of the first audio track 302A. The circuitry 202 may identify the start position of the first audio track 302A based on the comparison of the received first audio segment 304 with the first audio portion 308A of the first audio track 302A (also represented as Audio Track A). For example, the first audio portion 308A of the first audio track 302A may be an introductory music portion of the first audio track 302A where only an introduction music (e.g., song intro) is played and the lyrics of the first audio track 302A are not present. For example, the circuitry 202 may be configured to determine if any lyrics of the first audio track 302A are present in the received first audio segment 304. The circuitry 202 may be further configured to determine the presence of the lyrics of the first audio track 302A in the first audio portion 308A of the first audio track 302A. The circuitry 202 may be further configured to identify the start position of the first audio track 302A, based on the absence of the lyrics of the first audio track 302A in the first audio portion 308A and the received first audio segment 304. Alternatively stated, the received first audio segment 304 may be an introductory portion of the first audio track 302A, and the actual lyrics of the first audio track 302A may start after the first audio segment 304, and that may be the start position of the first audio track 302A sung by the first performer-of-interest 114, in the live event. Based on the identification of the start position of the first audio track 302A, the circuitry 202 may be further configured to generate the notification information to notify a user, such as the user 112 (i.e. spectator), who may be a part of the audience holding the electronic device 102, about the start position of the first audio track 302A. The circuitry 202 may be further configured to control the display screen 110 to display the generated notification information. For example, as shown in FIG. 3, the timeline 306 is shown, which depicts that the generated notification information, such as "This is song intro and actual song and associated lyrics will begin in next 3 seconds", is displayed on the application interface 214 of the display screen 110 at a first time instance, such as "t1".

In accordance with an embodiment, the circuitry 202 may be further configured to extract the first lyrics information 310 of the first audio track 302A (also represented as Audio Track A) from the server 106. The circuitry 202 may be further configured to control the display screen 110 to display the first lyrics information 310 of the first audio track 302A (also represented as Audio Track A) based on the identified start position. The first lyrics information 310 of the first audio track 302A may be displayed when the first performer-of-interest 114 (such as the first singer) sings the first audio track 302A (such as the first song) during the live concert in real-time or near real-time. For example, as shown in FIG. 3, a first portion of the first lyrics information 310, such as "Every Night", of the second audio portion 308B of the first audio track 302A may be displayed at a second time instance, such as "t2". The first portion of the first lyrics information 310 may be text associated with the second audio portion 308B of the first audio track 302A, for example, "Every Night" may be the text associated with the second audio portion 308B of the first audio track 302A. The first portion of the first lyrics information 310, such as "Every Night", of the second audio portion 308B of the first audio track 302A may be displayed on the application interface 214 when the first performer-of-interest 114 may sing the second audio portion 308B of the first audio track 302A during the live event or with some lag. Similarly, as shown in FIG. 3, a second portion of the first lyrics information 310, such as "In my dreams", of the third audio portion 308C of the first audio track 302A may be displayed at a third time instance, such as "t3". The second portion of the first lyrics information 310 may be text associated with the third audio portion 308C of the first audio track 302A, for example, "In my dreams" may be the text associated with the third audio portion 308C of the first audio track 302A. The second portion of the first lyrics information 310, such as "In my dreams", of the third audio portion 308C of the first audio track 302A may be displayed on the application interface 214 when the first performer-of-interest 114 may sing the third audio portion 308C of the first audio track 302A during the live event or with some lag.

In another example, as shown in FIG. 3, a third portion of the first lyrics information 310 (such as "Go On") of an $N^{th}$ audio portion 308N of the first audio track 302A may be displayed at a $N^{th}$ time instance, such as "tN". The $N^{th}$ audio portion 308N of the first audio track 302A may be any other portion (e.g., subsequent portions) of the first audio track 302A that the first performer-of-interest 114 (e.g., the first singer) may be singing in the live concert. The third portion of the first lyrics information 310 may be text associated with the $N^{th}$ audio portion 308N of the first audio track 302A, for example "Go On" may be the text associated with the $N^{th}$ audio portion 308N of the first audio track 302A. The third portion of the first lyrics information 310, such as "Go On", of the $N^{th}$ audio portion 308N of the first audio track 302A may be displayed on the application interface 214 when the first performer-of-interest 114 may sing the $N^{th}$ audio portion 308N of the first audio track 302A during the live event or with some lag. In such cases, a user, such as the user 112, present in the audience and associated with the electronic device 102, may be able to determine the audio track (e.g., the song) that the singer may be singing during the live concert and may be able to view the lyrics associated with the song on the display screen 110 in real-time or near real-time.

Figure 4:
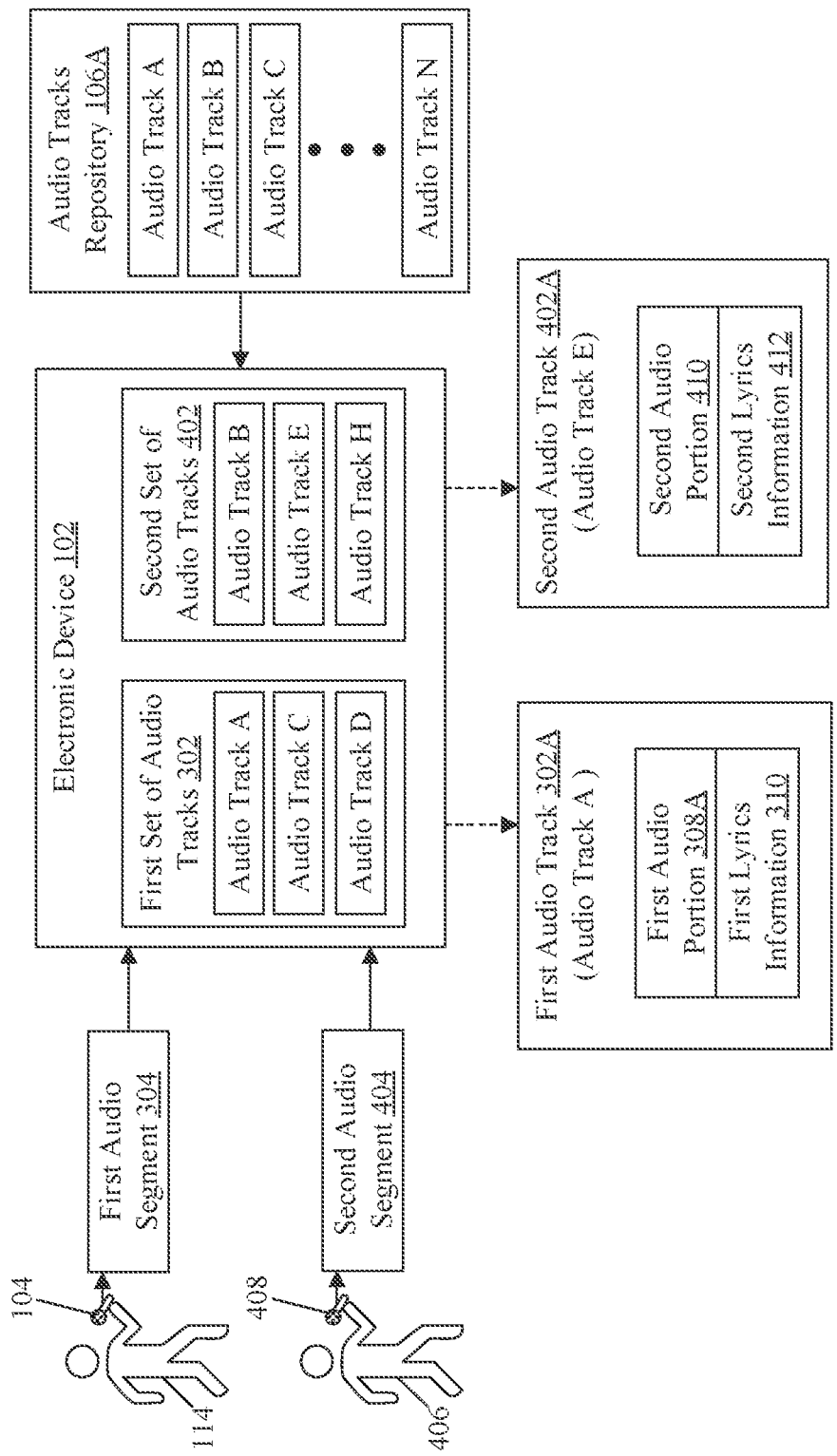
FIG. 4 illustrates a scenario for determination of an audio track enunciated by a plurality of performer-of-interests at a live event based on identification of the plurality of users-of-interest, in accordance with an embodiment of the disclosure.

FIG. 4 illustrates a scenario for determination of an audio track enunciated by a plurality of users-of-interest at a live event based on identification of the plurality of users-of-interest at the live event, in accordance with an embodiment of the disclosure. FIG. 4 is explained in conjunction with elements from FIG. 1, FIG. 2, and FIG. 3. With reference to FIG. 4, there is shown the electronic device 102, the first audio capturing device 104, the audio tracks repository 106A, the first performer-of-interest 114, the first set of audio tracks 302, the first audio track 302A, the first audio segment 304, the first audio portion 308A, and the first lyrics information 310. There is further shown a second set of audio tracks 402, a second audio track 402A, a second audio segment 404, a second performer-of-interest 406, a second audio capturing device 408, a second audio portion 410, and second lyrics information 412. In accordance with an embodiment, the first performer-of-interest 114 (for example, the first singer) and the second performer-of-interest 406 (for example, the second singer) may be present at a live event (for example, a live concert). The first performer-of-interest 114 (e.g., the first singer) may be associated with the first audio capturing device 104 and the second performer-of-interest 406 (e.g., the second singer) may be associated with the second audio capturing device 408. The first audio capturing device 104 and the second audio capturing device 408 may be communicatively coupled to the electronic device 102.

In accordance with an embodiment, the circuitry 202 may be further configured to determine the identification information of the first performer-of-interest 114, based on the geo-location of the electronic device 102 (as shown and described in FIG. 1 and FIG. 3). In some embodiments, the identification information of the first performer-of-interest 114 may be determined based on a user-input received from a user, such as the user 112. The user-input received from the user 112 may be associated with the identification information of the first performer-of-interest 114. Similarly, the circuitry 202 may be further configured to determine the identification information of the second performer-of-interest 406 (e.g., the second singer). The circuitry 202 may be configured to determine the identification information of the second performer-of-interest 406, based on the geo-location of the electronic device 102. For example, at a particular live event, the first performer-of-interest 114 (such as the first singer) and the second performer-of-interest 406 (such as the second singer) may be performing together. For example, the first singer and the second singer may sing different songs in a medley. The location sensor 206 may be configured to determine the geo-location of the electronic device 102. The circuitry 202 may be configured to retrieve a list of events that may be occurring at different geo-locations around the electronic device 102 in a current date and current time. The circuitry 202 may be further configured to determine the live event that may be occurring at the same geo-location as that of the electronic device 102. The circuitry 202 may be further configured to determine the identification information (such as the name or other identity) of the first performer-of-interest 114 and the second performer-of-interest 406, present at the live event.

The circuitry 202 may be further configured to retrieve the first set of audio tracks 302 from the audio tracks repository 106A, based on the identification information of the first performer-of-interest 114 (as shown and described in FIG. 3). Similarly, the circuitry 202 may be further configured to retrieve the second set of audio tracks 402 from the audio tracks repository 106A, based on the identification information of the second performer-of-interest 406. The second set of audio tracks 402 may be a plurality of songs sung by the second performer-of-interest 406 in previous live concerts. For example, as shown in FIG. 4, the first set of audio tracks 302 may include the Audio Track A, Audio Track C, and Audio Track D of the plurality of audio tracks in the audio tracks repository 106A, and the second set of audio tracks 402 may include Audio Track B, Audio Track E, and Audio Track H, of the plurality of audio tracks in the audio tracks repository 106A.

The circuitry 202 may be further configured to receive the first audio segment 304 of the vocal deliverance of the first performer-of-interest 114 from the first audio capturing device 104 at the live event (as shown and described in FIG. 3). For example, the received first audio segment 304 may be a portion of a first song sung by the first performer-of-interest 114 during the live concert. The circuitry 202 may be further configured to receive the second audio segment 404 of a vocal deliverance of the second performer-of-interest 406 from the second audio capturing device 408. For example, the received second audio segment 404 may be a portion of a second song sung by the second performer-of-interest 406 during the live concert. The circuitry 202 may be further configured to determine each audio track that the first performer-of-interest 114 and the second performer-of-interest 406 may be singing in the live concert. The circuitry 202 may be further configured to determine the first audio track 302A (also represented as Audio Track A) that the first performer-of-interest 114 may sing in the live event. The first audio track 302A may be determined (or identified) based on the comparison of the first audio characteristic of the first audio segment 304 with the second audio characteristic of the first audio portion 308A of the first audio track 302A of the first set of audio tracks 302 (as shown and described in FIG. 1 and FIG. 3).

The circuitry 202 may be further configured to determine the second audio track 402A (also represented as Audio Track E) that the second performer-of-interest 406 may sing in the live event. The second audio track 402A may be determined based on a comparison of a third audio characteristic of the received second audio segment 404 with a fourth audio characteristic of an audio portion (such as an initial audio portion) of each audio track of the second set of audio tracks 402. For example, the audio comparator 204 may be configured to compare the third audio characteristic of the received second audio segment 404 with the fourth audio characteristic of the second audio portion 410 of the second audio track 402A (also represented as Audio Track E) of the second set of audio tracks 402. The second audio portion 410 of the second audio track 402A of the second set of audio tracks 402 may be a portion (such as an introductory portion of a song) of the second audio track 402A of the second set of audio tracks 402. The third audio characteristic of the second audio segment 404 (e.g., the audio segment received from second singer) and the fourth audio characteristic of the second audio portion 410 (e.g. portion of a song of the plurality of songs of the second singer retrieved from the server 106) of the second audio track 402A may be a combination of the plurality of audio parameters. The audio comparator 204 may be configured to compare the third audio characteristic and the fourth audio characteristic. The circuitry 202 may be configured to determine the second audio track 402A (also represented as Audio Track E) as the audio track that the second performer-of-interest 406 may be singing in the live concert if the third audio characteristic is same as or nearly same as the fourth audio characteristic of the second audio portion 410 of the second audio track 402A.

The circuitry 202 may be further configured to extract the first lyrics information 310 associated with the first audio track 302A (also represented as Audio Track A) and the second lyrics information 412 associated with the second audio track 402A (also represented as Audio Track E) from the server 106. The circuitry 202 may be further configured to control the display screen 110 (not shown) to display the first lyrics information 310 associated with the first audio track 302A, when the first performer-of-interest 114 sings the first audio track 302A in the live event, in real-time or near real-time. The circuitry 202 may be further configured to control the display screen 110 (not shown) to display the second lyrics information 412 associated with the second audio track 402A, when the second performer-of-interest 406 sings the second audio track 402A in the live event, in real-time or near real-time. For example, a user, such as the user 112 (who may a part of the audience), of the electronic device 102 may be able to view the first lyrics of the first audio track 302A (e.g., the first song) and the second lyrics of the second audio track 402A (e.g., the second song) as and when the first singer and the second singer sings the first audio track 302A and the second audio track 402A in the live concert. The first performer-of-interest 114 and the second performer-of-interest 406 may be different from each other (such as the first performer-of-interest 114 and the second performer-of-interest 406 may be different singers). In some other embodiments, the first performer-of-interest 114 and the second performer-of-interest 406 may be same. For example, in such cases, a singer (e.g., the first performer-of-interest 114) may be singing two different songs together in a medley during the live concert.

Figure 5:
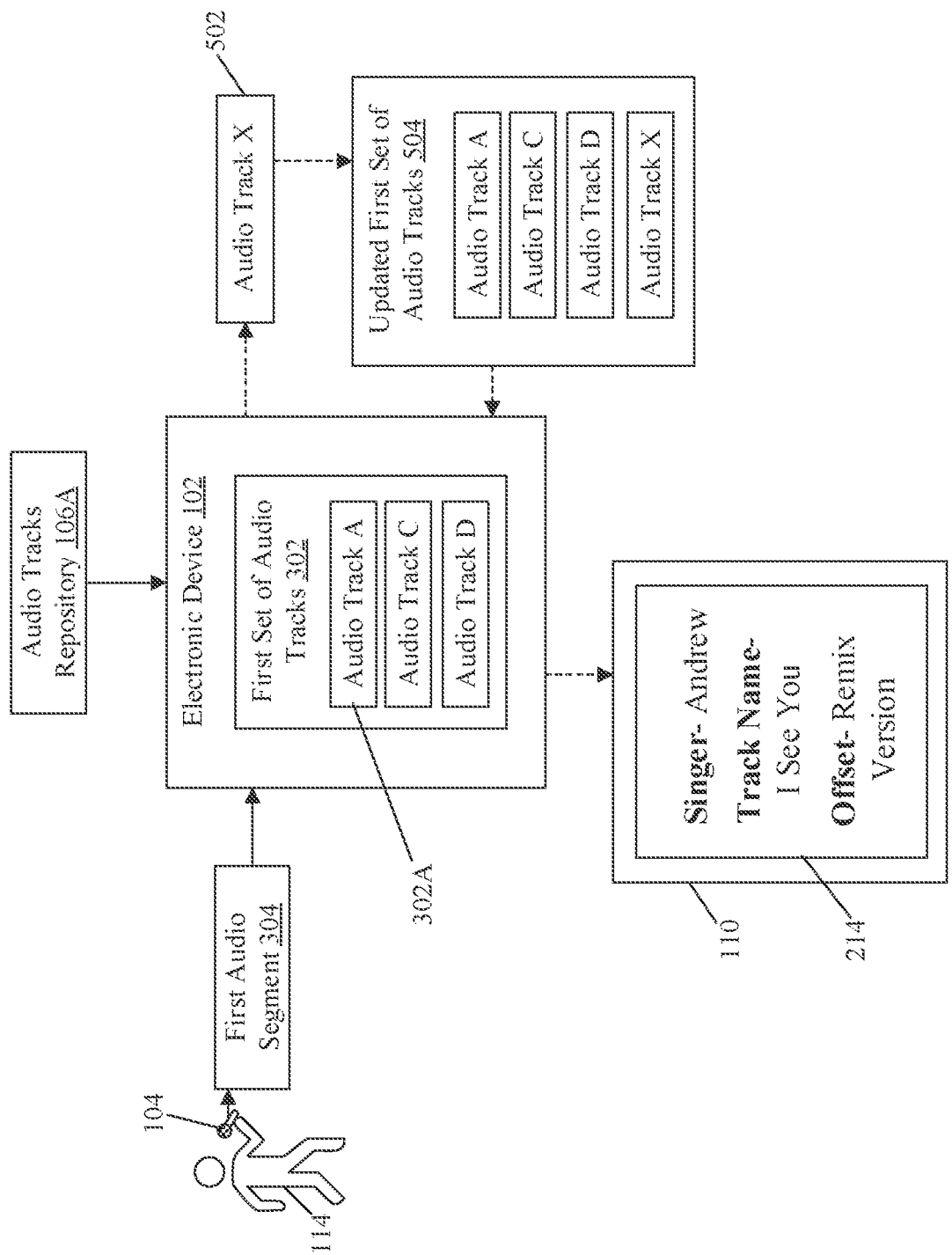
FIG. 5 illustrates a scenario for updating a first set of audio tracks associated with a performer-of-interest, based on determination of offset information between a received audio segment and a determined audio track, in accordance with an embodiment of the disclosure.

FIG. 5 illustrates an exemplary scenario for updating a first set of audio tracks associated with a performer-of-interest, based on determination of offset information between a received audio segment and a determined audio track, in accordance with an embodiment of the disclosure. FIG. 5 is explained in conjunction with elements from FIGS. 1, 2, 3 and 4. With reference to FIG. 5, there is further shown an updated audio track 502 and an updated first set of audio tracks 504. There is also shown the electronic device 102, the first audio capturing device 104, the audio tracks repository 106A, the display screen 110, the first performer-of-interest 114, the application interface 214, the first audio segment 304, and the first set of audio tracks 302.

In accordance with the exemplary scenario of FIG. 5, the circuitry 202 may be configured to receive the first audio segment 304 of the vocal deliverance of the first performer-of-interest 114 from the first audio capturing device 104 at the live event. The circuitry 202 may be further configured to retrieve the first set of audio tracks 302 from the audio tracks repository 106A, based on the identification information of the first performer-of-interest (e.g., the first singer in the live concert). For example, the first set of audio tracks 302 may include the Audio Track A, Audio Track C, and Audio Track D of the plurality of audio tracks of the audio tracks repository 106A.

In accordance with an embodiment, the audio comparator 204 may be further configured to determine offset information between the received first audio segment 304 and the determined first audio track 302A (also represented as Audio Track A). The offset information may indicate a deviation between the levels of the plurality of audio parameters of the first audio characteristic of the received first audio segment 304 and the second audio characteristic of the first audio portion of the determined first audio track 302A. The plurality of audio parameters may include, but are not limited to, a loudness parameter, a pitch parameter, a tone parameter, a rate-of-speech parameter, a voice quality parameter, a phonetic parameter, an intonation parameter, an intensity of overtones, a voice modulation parameter, a pronunciation parameter, a prosody parameter, a timbre parameter, and one or more psychoacoustic parameters. For example, if the first singer may sing the determined first audio track 302A in a different version (such as a remix version, a pop version, a cover version, etc.). In such a scenario, a level of at least one of the plurality of audio parameters of the first audio characteristic of the first audio segment 304 (i.e., the portion of the song that the first singer is currently singing in the live concert) may be different from the level of the plurality of audio parameters of the second audio characteristic of the first audio portion of the first audio track 302A (i.e., the version of the song retrieved from the server 106). The offset information may indicate the difference between at least one audio parameter of each of the first audio characteristic and the second audio characteristic.

The audio comparator 204 may be further configured to determine the offset information based on the comparison of the plurality of audio parameters of the first audio characteristic and the second audio characteristic. The circuitry 202 may be further configured to generate an updated audio track 502 (for example, an Audio Track X as shown in FIG. 5), based on the determined offset information. The updated audio track 502 may be a second audio track that may be different from the determined first audio track 302A (also represented as Audio Track A) of the first set of audio tracks 302. The updated audio track 502 (for example, Audio Track X) may be a new version of the determined first audio track 302A. For example, the updated audio track 502 may be a remix version of a normal version of a song of the first singer. The normal version may be the original version of the song when the song was first made public (or released in market). The circuitry 202 may be further configured to update the first set of audio tracks 302 based on an addition of the updated audio track 502 to the first set of audio tracks 302. The circuitry 202 may be further configured to store the updated audio track 502 in the updated first set of audio tracks 504. The updated first set of audio tracks 504 may include all the audio tracks that are present in the first set of audio tracks 302 and the updated audio track 502. For example, the updated first set of audio tracks 504 may include the Audio Track A, Audio Track C, Audio Track D, and the Audio Track X. The updated audio track 502 (such as the Audio Track X) stored in the updated first set of audio tracks 504 may be further utilized by the circuitry 202 for determination of the audio track that the first performer-of-interest 114 may sing in another live event.

In accordance with an embodiment, the circuitry 202 may be further configured to control the display screen 110 to display the determined offset information of the application interface 214. For example, as shown in FIG. 5, a name of the singer, such as "Andrew", a name of the audio track, such as "I See You", may be displayed on the application interface 214. The determined offset information may also be displayed on the application interface 214. For example, a name of the version of the updated audio track 502 may be displayed on the application interface 214, such as "Remix Version". The displayed offset information on the application interface 214 of the electronic device 102 may be useful for a user, such as the user 112 (not shown) in the audience, to identify the version of the audio track that the first performer-of-interest 114 may be singing in the live concert. Thus, the user 112 may be able to distinguish between different versions of the song sung by the first performer-of-interest 114 (such as the first singer).

In some embodiments, the circuitry 202 may be further configured to determine the offset information based on a comparison of a text of the received first audio segment 304 (i.e., a portion of the song that a singer may be singing in a live concert) and pre-stored lyrics of the audio track (i.e., the same song that the singer may be singing in the live concert). For example, in some scenarios of live concerts, a singer may enunciate some phrases, which may not be part of the song, such as "Hi There" or "How Are You", etc. In such cases, the circuitry 202 may be configured to remove such phrases from the updated audio track 502 (also represented as Audio Track X) before storing the updated audio track 502 and before the update of the first set of audio tracks 302. In some embodiments, the determined offset information may include the difference between the text of the received first audio segment 304 (i.e., a portion of the song that a singer may be singing in a live concert) and pre-stored lyrics of the audio track (i.e., the same song that the singer may be singing in the live concert). Based on set user-preferences, the offset information that includes the difference may also be displayed via the application interface 214 along with the pre-stored lyrics.

Figure 6:
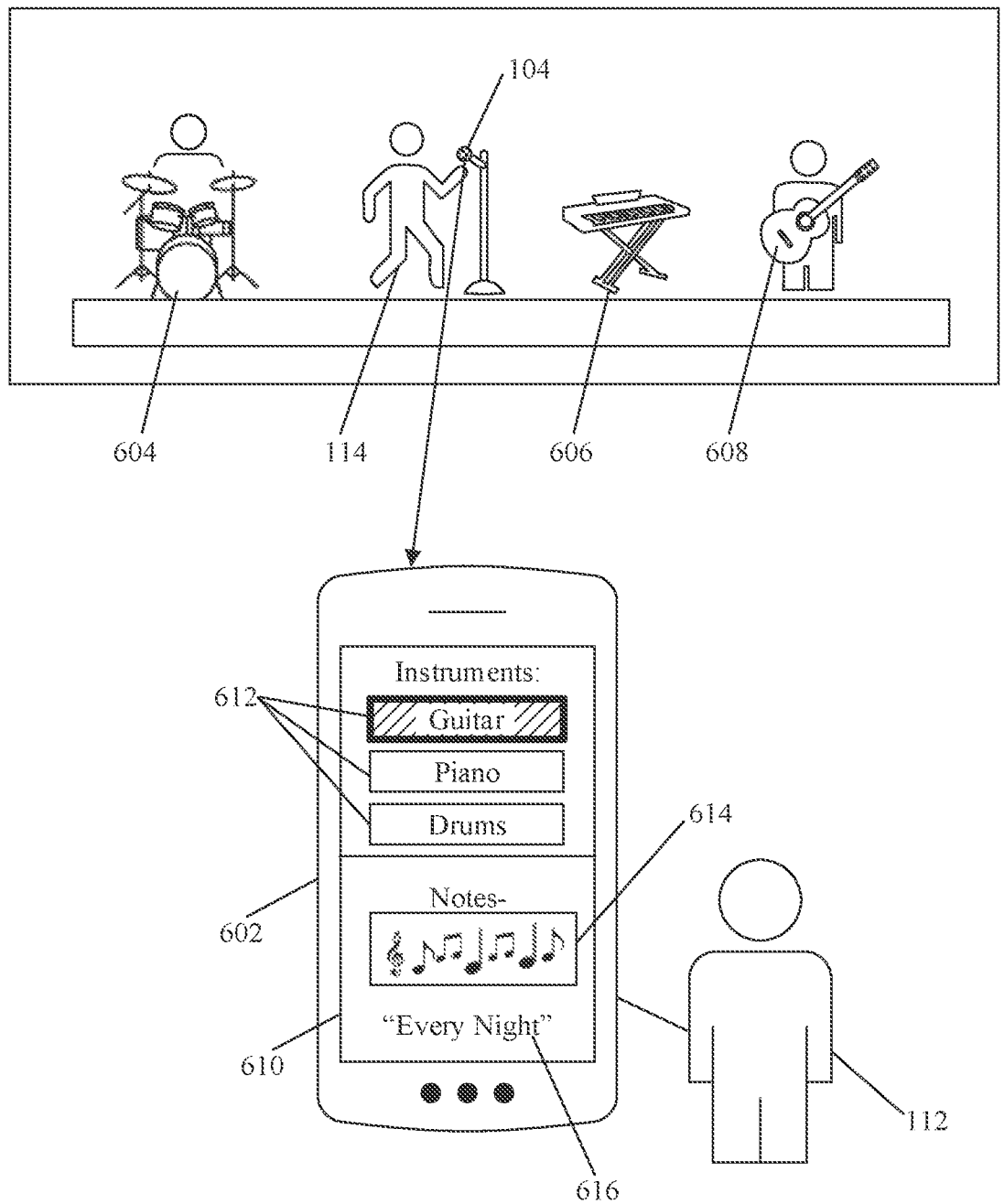
FIG. 6 illustrates a scenario for presentation of a plurality of audio notes associated with a plurality of audio sources on a display screen of an exemplary electronic device, in accordance with an embodiment of the disclosure.

FIG. 6 illustrates an exemplary scenario for presentation of a plurality of audio notes associated with a plurality of audio sources on a display screen of an exemplary electronic device, in accordance with an embodiment of the disclosure. FIG. 6 is explained in conjunction with elements from FIGS. 1, 2, 3, 4, 5, and 6. With reference to FIG. 6, there is shown an electronic device, such as a smartphone 602. There is also shown a first audio source 604, a second audio source 606, a third audio source 608, a display screen 610, a plurality of user interface (UI) elements 612, a plurality of audio notes 614, a text 616, the first audio capturing device 104, the user 112, and the first performer-of-interest 114. In accordance with the exemplary scenario of FIG. 6, the smartphone 602 may correspond to the electronic device 102 and the display screen 610 may correspond to the display screen 110 of the electronic device 102 (FIG. 1). The smartphone 602 may include a circuitry, such as the circuitry 202.

The circuitry 202 may be configured to receive a first audio segment from the first audio capturing device 104. The received first audio segment 304 may include a plurality of audio portions associated with a plurality of audio sources, such as the first audio source 604, the second audio source 606, and the third audio source 608. In some other embodiments, each audio source of the plurality of audio sources may be associated with a different audio capturing device. The plurality of audio sources may be a plurality of musical instruments present at the live event, that may be utilized to generate different musical sounds during the live event along with the singer (such as the first performer-of-interest 114) singing a song at the live event. Each audio source of the plurality of audio sources may be associated with a different musical sound. For example, the plurality of audio sources may include the first audio source 604 (such as a drum), the second audio source 606 (such as a piano), and the third audio source 608 (such as a guitar) at the live event. The received first audio segment may include an audio portion associated with each of the plurality of audio sources present at the live event, for example, the first audio source 604

(such as the drum), the second audio source 606 (such as the piano), and the third audio source 608 (such as the guitar).

In accordance with an embodiment, the circuitry 202 may be configured to render a UI on the display screen 610 of the smartphone. The UI rendered on the display screen 610 may include the plurality of UI elements 612 associated with each of the plurality of audio sources (such as the first audio source 604 (e.g., the drum), the second audio source 606 (e.g., the piano), and the third audio source 608 (e.g., the guitar) present in the live event. The circuitry 202 may be further configured to receive a user-input for the selection of at least an audio source of the plurality of audio sources. In this case, the user-input, for example, may be provided by the user, such as the user 112, associated with the smartphone 602.

In one example, the circuitry 202 may receive a user-input to select the third audio source 608 (such as the guitar) present at the live event, based on selection of a UI element associated with the third audio source 608 (such as the guitar) from the plurality of UI elements 612 rendered on the display screen 610. The UI element, associated with the third audio source 608 (such as the guitar), rendered on the display screen 610 may be highlighted. The user 112 may select that audio source from the plurality of audio sources for which the user 112 may want to view a plurality of audio notes associated with a particular audio source.

The circuitry 202 may be further configured to extract a set of audio portions from the plurality of audio portions of the received first audio segment 304, based on the selection of the third audio source 608 (e.g., the guitar). The extracted set of audio portions may be certain portions of the audio segment that may be associated with an audio (or sound) of the selected audio source, such as the third audio source 608. For example, the circuitry 202 may be configured to extract the set of audio portions that may be associated with the guitar, from the plurality of audio portions of the received first audio segment 304. The circuitry 202 may be further configured to determine the plurality of audio notes 614 for the extracted set of audio portions of the selected third audio source 608 (e.g., the guitar). The plurality of audio notes 614 may be a representation of a pitch and a duration of a sound in a musical notation. The plurality of audio notes 614 may be a representation of written music.

The circuitry 202 may be further configured to control the display screen 610 to display the determined plurality of audio notes 614 for the extracted set of audio portions of the third audio source 608 (e.g., the guitar). The plurality of audio notes 614 for the extracted set of audio portions may be displayed on the display screen 610, when the extracted set of audio portions may be played on the selected third audio source (such as the guitar) during the live event, in real-time or near real-time. For example, as shown in FIG. 6, the plurality of audio notes 614 may be displayed on the display screen 610 of the smartphone 602. In some embodiments, the displayed plurality of audio notes 614 may be utilized by students or music enthusiasts who are learning different musical instruments or want to know how to play a particular audio portion.

In accordance with an embodiment, the circuitry 202 may be further configured to display the text 616 that may be associated with the vocal deliverance (such as a song sung by a singer) of the first performer-of-interest 114 during the live event (such as a live concert), based on the received first audio segment 304. For example, the text 616, such as "Every Night", displayed on the display screen 610, may be text associated with a portion of a song that the first performer-of-interest 114 may be singing during the live concert, when the extracted plurality of audio portions of the received first audio segment 304 may be played on the plurality of audio sources (e.g., drums, piano, guitar, etc.) in real-time or near real-time.

In accordance with an embodiment, the circuitry 202 may be further configured to output the extracted set of audio portions of the selected third audio source 608 (e.g. the guitar) through a speaker, such as the speaker 210A (FIG. 2) associated with the smartphone 602. The extracted set of audio portions may be the portions of the received first audio segment 304 associated with a sound output of the selected third audio source 608. In such a scenario, the user 112 may be able to listen the audio portions associated only with the selected third audio source 608 of the plurality of audio sources at the live event. For example, the user 112 may listen to the audio portions that are only associated with a sound (or music) of the guitar at the live event (along with or without song lyrics and/or also along with or without sound of vocal deliverance of song).

Figure 7:
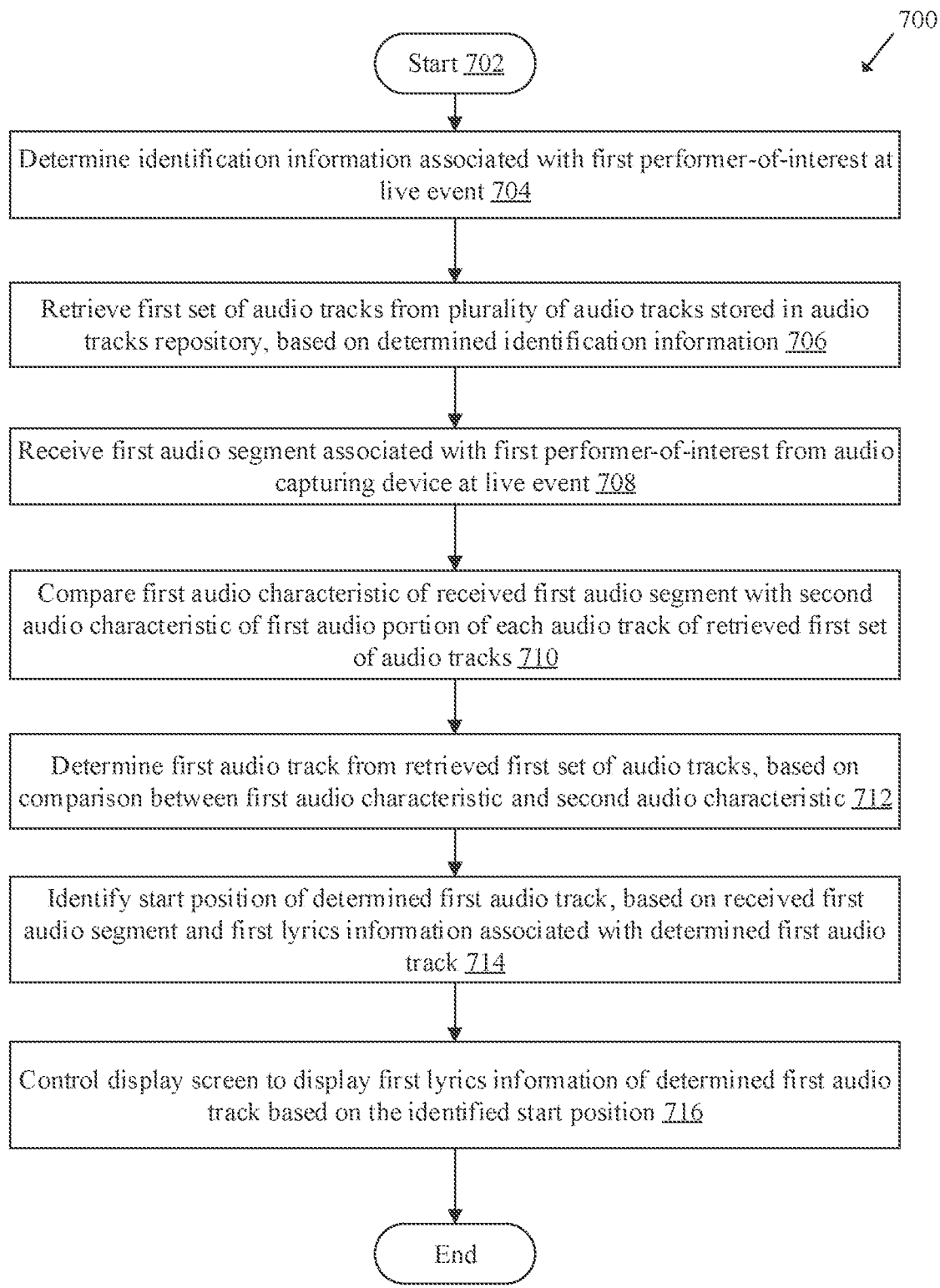
FIG. 7 is a flowchart that illustrates exemplary operations for audio track determination based on identification of a performer-of-interest at a live event, in accordance with an embodiment of the disclosure.

FIG. 7 is a flowchart that illustrates exemplary operations for audio track determination based on identification of a performer-of-interest at a live event, in accordance with an embodiment of the disclosure. With reference to FIG. 7, there is shown a flowchart 700. The flowchart 700 is described in conjunction with FIGS. 1, 2, 3, 4, 5, and 6. The operations from 704 to 716 may be implemented in the electronic device 102. The operations of the flowchart 700 may start at 702 and proceed to 704.

At 704, identification information associated with the first performer-of-interest 114 at the live event may be determined. The circuitry 202 may be configured to determine the identification information (for example, a name of the singer or band) associated with the first performer-of-interest 114 (for example, a first singer), based on at least one of a geo-location of the live event, date-time information of the live event, or a user input associated with the first performer-of-interest 114. The determination of the identification information associated with the first performer-of-interest 114 has been described, for example, in FIG. 1.

At 706, a first set of audio tracks may be retrieved from the plurality of audio tracks stored in the audio tracks repository 106A, based on the determined identification information. The circuitry 202 may be configured to retrieve the first set of audio tracks (such as the first set of audio tracks 302 (FIG. 3)) from the plurality of audio tracks stored in the audio tracks repository 106A, based on the determine identification information of the first performer-of-interest 114 (e.g., the first singer). For example, the first set of audio tracks 302 may be a plurality of songs sung by the first performer-of-interest 114 (such as the first singer) in previous live event.

At 708, the first audio segment associated with the first performer-of-interest 114 may be received from the first audio capturing device 104 at the live event. The circuitry 202 may be configured to receive the first audio segment (such as the first audio segment 304 (FIG. 3)) associated with the first performer-of-interest 114 (e.g., the first singer) from the first audio capturing device 104 at the live event. For example, the received first audio segment 304 may be a portion of a song sung by the first performer-of-interest 114 (e.g., the first singer) in a live concert.

At 710, the first audio characteristic of the received first audio segment may be compared with the second audio characteristic of the first audio portion of each audio track of the retrieved first set of audio tracks. The audio comparator 204 may be configured to compare the first audio characteristic of the received first audio segment 304 with the second audio characteristic of the first audio portion of each audio track of the retrieved first set of audio tracks 302. The first audio characteristic and the second audio characteristic may be a combination of the plurality of audio parameters, such as, a loudness parameter, a pitch parameter, a tone parameter, a rate-of-speech parameter, a voice quality parameter, a phonetic parameter, an intonation parameter, an intensity of overtones, a voice modulation parameter, a pronunciation parameter, a prosody parameter, a timbre parameter, and one or more psychoacoustic parameters. The audio comparator 204 may be configured to compare the levels of each of the plurality of audio parameters associated with first audio characteristic, with the levels of each of the plurality of audio parameters associated with second audio characteristic. For example, a level of the loudness parameter may be different for the first audio characteristic from the second audio characteristic.

At 712, the first audio track (e.g., a portion of a currently sung song) may be determined from the retrieved first set of audio tracks 302, based on the comparison between the first audio characteristic and the second audio characteristic. The circuitry 202 may be configured to determine the first audio track (such as the first audio track 302A (FIG. 3)) from the retrieved first set of audio tracks 302. For example, the first audio track 302A may be a song that the first performer-of-interest 114 may be singing in the live concert. The received first audio segment 304 may correspond to a portion of the determined first audio track 302A. The determination of the first audio track 302A from the retrieved first set of audio tracks 302 has been shown and described, for example, in FIG. 3.

At 714, a start position of the determined first audio track 302A may be identified, based on the received first audio segment 304 and first lyrics information 310 associated with the determined first audio track 302A. The circuitry 202 may be configured to identify the start position of the determined first audio track 302A. The start position of the first audio track 302A may be a position in the first audio track 302A, where the actual lyrics of the audio track begin. The identification of the start position of the first audio track 302A has been shown and described, for example, in FIG. 3.

At 716, the display screen 110 may be controlled to display the first lyrics information 310 of the determined first audio track 302A based on the identified start position. The circuitry 202 may be configured to control the display screen 110 to display the first lyrics information 310 of the determined first audio track 302A, based on the identified start position. The first lyrics information 310 of the first audio track 302A may be displayed on the display screen 110 when the first performer-of-interest 114 (e.g., the first singer) may sing the first audio track 302A in the live concert, in real-time or near-real time. In such a way, a user, such as the user 112, who is a part of the audience, may be able to follow along with the singer in the live concert. The control may pass to end.

Exemplary aspects of the disclosure may include an electronic device (such as the electronic device 102) that includes a circuitry (such as the circuitry 202). The circuitry 202 may be configured to determine identification information associated with a first performer-of-interest (such as the first performer-of-interest 114) at a live event. The circuitry 202 may be further configured to retrieve a first set of audio tracks (such as the first set of audio tracks 302) from a plurality of audio tracks (such as the audio tracks repository 106A), based on the determined identification information. The first set of audio tracks 302 may be associated with the first performer-of-interest 114. The circuitry 202 may be further configured to receive a first audio segment (such as the first audio segment 304) associated with the first performer-of-interest 114 from an audio capturing device (such as the first audio capturing device 104) at the live event. The circuitry 202 may be further configured to compare a first audio characteristic of the received first audio segment 304 with a second audio characteristic of a first audio portion of each of the retrieved first set of audio tracks 302. The circuitry 202 may be further configured to determine a first audio track (such as the first audio track 302A) from the retrieved first set of audio tracks 302 based on the comparison between the first audio characteristic and the second audio characteristic. The circuitry 202 may be further configured to identify a start position of the determined first audio track 302A based on the received first audio segment 304 and first lyrics information 310 associated with the determined first audio track 302A. The circuitry 202 may be further configured to control a display screen (such as the display screen 110) to display the first lyrics information 310 of the determined first audio track 302A based on the identified start position.

In accordance with an embodiment, the circuitry 202 may be further configured to receive a plurality of first audio segments associated with the determined first audio track 302A from the first audio capturing device 104 at the live event. The circuitry 202 may be further configured to extract first text information from the first lyrics information 310 for each of the plurality of first audio segments. The circuitry 202 may be further configured to control the display screen 110 to display the extracted first text information based on playback of each of the plurality of first audio segments. The identification information associated with the first performer-of-interest 114 of the first set of audio tracks 302 may be determined based on at least one of a geo-location of the live event, date-time information of the live event, or a user input associated with the first performer-of-interest 114. Each of the first audio characteristic and the second audio characteristic may be a combination of a plurality of audio parameters. The plurality of audio parameters may include a loudness parameter, a pitch parameter, a tone parameter, a rate-of-speech parameter, a voice quality parameter, a phonetic parameter, and an intonation parameter. The plurality of audio parameters may further include an intensity of overtones, a voice modulation parameter, a pronunciation parameter, a prosody parameter, a timbre parameter, and one or more psychoacoustic parameters.

In accordance with an embodiment, the circuitry 202 may be further configured to convert the received first audio segment 304 to first text information corresponding to the received first audio segment 304. The circuitry 202 may be further configured to compare the converted first text information corresponding to the received first audio segment 304 and second text information for the first audio portion of each of the retrieved first set of audio tracks 302. The circuitry 202 may be further configured to determine the first audio track 302A, based on the comparison of the converted first text information and the second text information. In accordance with an embodiment, the circuitry 202 may be further configured to receive a second audio segment (such as the second audio segment 404) associated with a second performer-of-interest (such as the second performer-of-interest 406) from the first audio capturing device 104 at the live event. The circuitry 202 may be further configured to determine a second audio track from the retrieved first set of audio tracks 302 based on a comparison between a third audio characteristic of the received second audio segment 404 and a fourth audio characteristic of a second audio portion of each of the retrieved first set of audio tracks 302. The circuitry 202 may be further configured to control the display screen 110 to display second lyrics information of the determined second audio track, wherein the first audio track 302A is different from the second audio track. In accordance with an embodiment, the first performer-of-interest 114 and the second performer-of-interest 406 may be same. In accordance with another embodiment, the first performer-of-interest 114 and the second performer-of-interest 406 may be different.

In accordance with an embodiment, the circuitry 202 may be further configured to generate notification information associated with the start position of the determined first audio track 302A. The circuitry 202 may be further configured to control the display screen 110 to display of the generated notification information. The circuitry 202 may be further configured to determine offset information between the first audio characteristic of the received first audio segment 304 and the second audio characteristic of the first audio portion of the determined first audio track 302A. The offset information may indicate a deviation between at least one audio parameter of each of the first audio characteristic and the second audio characteristic. The circuitry 202 may be further configured to generate a second audio track based on the determined first audio track and the offset information. The circuitry 202 may be further configured to update the first set of audio tracks 302 based on the generated second audio track. The circuitry 202 may be further configured to display the determined offset information on the display screen 110.

In accordance with an embodiment, the first audio segment may include a plurality of audio portions. The plurality of audio portions may be associated with a plurality of audio sources at the live event. The circuitry 202 may be further configured to receive a user input to select at least one of the plurality of audio sources. The circuitry 202 may be further configured to extract a set of audio portions from the plurality of audio portions based on the received user input. The set of audio portions may be associated with the at least one of the plurality of audio sources. The circuitry 202 may be further configured to control the display screen 110 to display a plurality of audio notes for the extracted set of audio portions. The circuitry 202 may be further configured to output the extracted set of audio portions through a speaker (such as the speaker 210A) associated with the electronic device 102.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

Various embodiments of the disclosure may provide a non-transitory, computer-readable medium and/or storage medium, and/or a non-transitory machine readable medium and/or storage medium stored thereon, instructions executable by a machine and/or a computer that comprises one or more circuits. The instructions may be executable by the machine and/or the computer to execute operations that may comprise, determining identification information associated with a first performer-of-interest at a live event. A first set of audio tracks may be retrieved from a plurality of audio tracks based on the determined identification information. The first set of audio tracks may be associated with the first performer-of-interest. A first audio segment associated with the first performer-of-interest may be received from an audio capturing device at the live event. A first audio characteristic of the received first audio segment may be compared with a second audio characteristic of a first audio portion of each of the retrieved first set of audio tracks. A first audio track may be determined from the retrieved first set of audio tracks, based on the comparison between the first audio characteristic and the second audio characteristic. A start position of the determined first audio track may be identified, based on the received first audio segment and first lyrics information associated with the determined first audio track. A display screen may be controlled to display the first lyrics information of the determined first audio track based on the identified start position.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims

What is claimed is:
1. An electronic device, comprising:
  circuitry configured to:
    determine identification information associated with a first performer-of-interest at a live event;
    retrieve a set of audio tracks from a plurality of audio tracks based on the determined identification information, wherein
      the set of audio tracks are associated with the first performer-of-interest;
    receive a first audio segment associated with the first performer-of-interest from an audio capturing device at the live event;
    convert the received first audio segment to first text information;
    compare the first text information with second text information, wherein
      the second text information is associated with a first audio portion of each of the retrieved set of audio tracks,
      the first text information corresponds to a portion of first lyrics information associated with the received first audio segment, and the second text information corresponds to a portion of second lyrics information associated with the first audio portion of each of the retrieved set of audio tracks;

determine a first audio track from the retrieved set of audio tracks based on the comparison between the first text information and the second text information;

identify a start position of the determined first audio track based on absence of lyrics in a portion of the determined first audio track and the received first audio segment;

identify third lyrics information associated with the determined first audio track wherein
 the third lyrics information is different from the first lyrics information and the second lyrics information; and
 control a display screen to display the third lyrics information of the determined first audio track based on the identified start position.

2. The electronic device according to claim 1, wherein the circuitry is further configured to:
 receive a plurality of first audio segments associated with the determined first audio track from the audio capturing device at the live event;
 extract third text information from the third lyrics information for each of the plurality of first audio segments; and
 control the display screen to display the extracted third text information based on playback of each of the plurality of first audio segments.

3. The electronic device according to claim 1, wherein the identification information associated with the first performer-of-interest of the set of audio tracks is determined based on at least one of a geo-location of the live event, date-time information of the live event, or a user input associated with the first performer-of-interest.

4. The electronic device according to claim 1, wherein each of a first audio characteristic of the received first audio segment and a second audio characteristic of the first audio portion of each of the retrieved set of audio tracks is a combination of a plurality of audio parameters.

5. The electronic device according to claim 4, wherein the plurality of audio parameters comprises a loudness parameter, a pitch parameter, a tone parameter, a rate-of-speech parameter, a voice quality parameter, a phonetic parameter, an intonation parameter, an intensity of overtones, a voice modulation parameter, a pronunciation parameter, a prosody parameter, a timbre parameter, and at least one psychoacoustic parameter.

6. The electronic device according to claim 1, wherein the circuitry is further configured to:
 receive a second audio segment associated with a second performer-of-interest from the audio capturing device at the live event;
 determine a second audio track from the retrieved set of audio tracks based on a comparison between a first audio characteristic of the received second audio segment and a second audio characteristic of a second audio portion of each of the retrieved set of audio tracks; and
 control the display screen to display fourth lyrics information of the determined second audio track, wherein the first audio track is different from the second audio track.

7. The electronic device according to claim 6, wherein the first performer-of-interest and the second performer-of-interest are same.

8. The electronic device according to claim 7, wherein the first performer-of-interest and the second performer-of-interest are different.

9. The electronic device according to claim 1, wherein the circuitry is further configured to:
 generate notification information associated with the start position of the determined first audio track; and
 control the display screen to display of the generated notification information.

10. The electronic device according to claim 1, wherein the circuitry is further configured to:
 determine offset information between a first audio characteristic of the received first audio segment and a second audio characteristic of the determined first audio track, wherein the offset information indicates a deviation between at least one audio parameter of each of the first audio characteristic and the second audio characteristic;
 generate a second audio track based on the determined first audio track and the offset information; and
 update the set of audio tracks based on the generated second audio track.

11. The electronic device according to claim 10, wherein the circuitry is further configured to display the determined offset information on the display screen.

12. The electronic device according to claim 1, wherein the first audio segment comprises a plurality of audio portions,
 the plurality of audio portions is associated with a plurality of audio sources at the live event, and
 the circuitry is further configured to:
  receive a user input to select at least one of the plurality of audio sources;
  extract a set of audio portions from the plurality of audio portions based on the received user input, wherein the set of audio portions are associated with the at least one of the plurality of audio sources;
  control the display screen to display a plurality of audio notes for the extracted set of audio portions; and
  output the extracted set of audio portions through a speaker, wherein the speaker is associated with the electronic device.

13. A method, comprising:
in an electronic device:
determining identification information associated with a performer-of-interest at a live event;
retrieving a set of audio tracks from a plurality of audio tracks based on the determined identification information, wherein the set of audio tracks are associated with the performer-of-interest;
receiving an audio segment associated with the performer-of-interest from an audio capturing device at the live event;
converting the received audio segment to first text information;
comparing the first text information with second text information, wherein
 the second text information is associated with an audio portion of each of the retrieved set of audio tracks,
 the first text information corresponds to a portion of first lyrics information associated with the received audio segment, and the second text information corresponds to a portion of second lyrics information associated with the audio portion of each of the retrieved set of audio tracks;

determining a first audio track from the retrieved first set of audio tracks based on the comparison between the first text information and the second text information;

identifying a start position of the determined first audio track based on absence of lyrics in a portion of the determined first audio track and the received audio segment, identifying third lyrics information associated with the determined first audio track, wherein
the third lyrics information is different from the first lyrics information and the second lyrics information; and controlling a display screen to display the third lyrics information of the determined first audio track based on the identified start position.

14. The method according to claim 13, wherein the identification information associated with the performer-of-interest of the set of audio tracks is determined based on at least one of a geo-location of the live event, date-time information of the live event, or a user input associated with the performer-of-interest.

15. The method according to claim 13, further comprising:
receiving a plurality of audio segments associated with the determined first audio track from the audio capturing device at the live event;
extracting third text information from the third lyrics information for each of the plurality of audio segments; and
controlling the display screen to display the extracted third text information based on playback of each of the plurality of audio segments.

16. The method according to claim 13, further comprising:
determining offset information between a first audio characteristic of the received audio segment and a second audio characteristic of the determined first audio track, wherein the offset information indicates a deviation between at least one audio parameter of each of the first audio characteristic and the second audio characteristic;
generating a second audio track based on the determined first audio track and the offset information; and
updating the set of audio tracks based on the generated second audio track.

17. The method according to claim 13, wherein each of a first audio characteristic of the received audio segment and a second audio characteristic of the audio portion of each of the retrieved set of audio tracks is a combination of a plurality of audio parameters.

18. The method according to claim 17, wherein the plurality of audio parameters comprises a loudness parameter, a pitch parameter, a tone parameter, a rate-of-speech parameter, a voice quality parameter, a phonetic parameter, an intonation parameter, an intensity of overtones, a voice modulation parameter, a pronunciation parameter, a prosody parameter, a timbre parameter, and at least one psychoacoustic parameter.

19. A non-transitory computer-readable medium having stored thereon, computer-executable instructions which, when executed by an electronic device, cause the electronic device to execute operations, the operations comprising:
determining identification information associated with a performer-of-interest at a live event;
retrieving a set of audio tracks from a plurality of audio tracks based on the determined identification information, wherein the set of audio tracks are associated with the performer-of-interest;
receiving an audio segment associated with the performer-of-interest from an audio capturing device at the live event;
converting the received audio segment to first text information;
comparing the first text information with second text information, wherein
the second text information is associated with an audio portion of each of the retrieved set of audio tracks,
the first text information corresponds to a portion of first lyrics information associated with the received audio segment, and
the second text information corresponds to a portion of second lyrics information associated with the audio portion of each of the retrieved set of audio tracks;
determining an audio track from the retrieved set of audio tracks based on the comparison between the first text information and the second text information;
identifying a start position of the determined audio track based on absence of lyrics in a portion of the determined audio track and the received audio segment,
identifying third lyrics information associated with the determined audio track wherein
the third lyrics information is different from the first lyrics information and the second lyrics information; and
controlling a display screen to display the third lyrics information of the determined audio track based on the identified start position.

* * * * *